United States Patent Office 3,375,965
Patented Apr. 2, 1968

3,375,965
ULTRASONIC WELDER
Mikhail Pavlovich Zaitsev and Jury Vasiljevich Kholopov, Leningrad, U.S.S.R., assignors to Vsesojuzny-Nauchno-Issledovatelsky Institute Elektrosvarochnogo Oborudovania, Leningrad, U.S.S.R.
Filed Oct. 27, 1964, Ser. No. 406,774
4 Claims. (Cl. 228—1)

ABSTRACT OF THE DISCLOSURE

An ultrasonic welder having a housing containing a transducer for converting electrical energy into mechanical vibratory energy at an ultrasonic frequency, and a vibratory energy concentrator for transmitting the vibratory energy from the transducer substantially in a horizontal direction to a first rod disposed substantially vertically in a working position and rigidly fixed at its lower end, a second rod being provided above the said first rod in vertical alignment therewith for clamping workpieces to be welded between the adjacent ends of the said rods, a drive being connected with the second rod for adjustment of its vertical position to enable placement of the workpieces between the rods and to apply a clamping force to the workpieces during welding.

---

Figure 1:
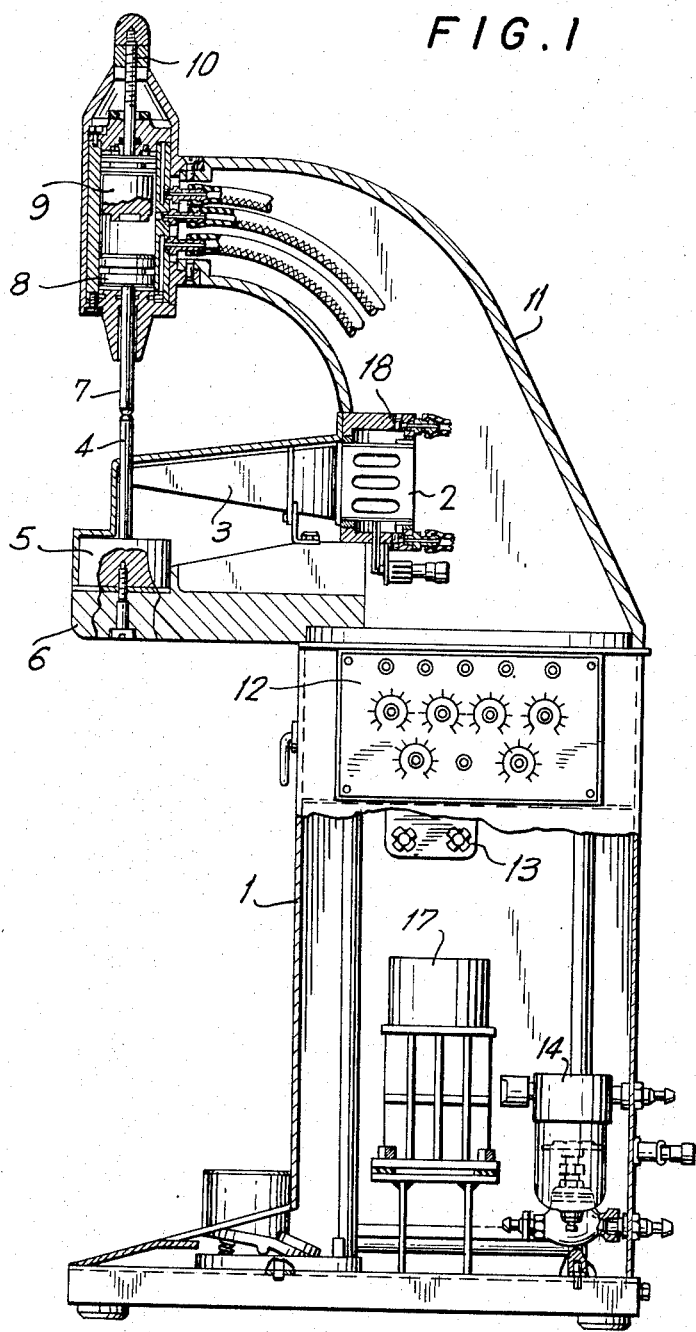

The present invention relates to ultrasonic welders operating on the principle of bending vibrations of a resonating rod. The known ultrasonic welders with acoustic unit utilize either a rotary or stationary mounting of said unit. There are also welders having massive flat supports or "pin-like" supports.

The kinematic arrangement of ultrasonic welders with a rotary acoustic unit is rather complicated; any alteration in the total thickness of the articles to be welded requires checking the position of the support in relation to the horizontal axis of the acoustic unit. The mechanical linkage between the acoustic unit and the welder housing is limited by the respective positions of the planes of a concentrator and a magnetostriction transducer.

During one welding cycle the whole acoustic unit, which is rather bulky and heavy, moves about its axis of rotation. A number of known welders have acoustic units which make a reciprocal movement—up and down —in the course of one welding cycle.

The use of massive supports or "pins" in ultrasonic welders causes the weldments to turn about each other and around the welding tip during the process of welding. A flat support allows only articles of a comparatively simple shape to be welded together.

There are also ultrasonic welders with acoustic unit systems, in which the clamping force of the workpieces to be welded is furnished by a special diaphragm positioned in the plane of the concentrator. Such arrangement of the acoustic unit involves considerable increase in the overall dimensions of the welder and complication of the fastening of the acoustic unit, as well as additional energy losses.

The primary object of the present invention is to provide an ultrasonic welder with an acoustic unit arranged in such a manner as to provide a simple design and reliable operation of the welder, as well as high productivity and good quality of the welding.

According to the present invention, in a welder with an acoustic unit, comprising a mechanical-to-electrical energy transducer, a concentrator, an active-resonance rod and a passive-resonance rod, this object is achieved by a rigid fastening and acoustic connection of one end of said active-resonance rod to the welder housing below the horizontal axis of the concentrator.

It is advisable to fix an end of the active-resonance rod in the cantilever part of the welder housing. However, it is also feasible to fix the end of the active-resonance rod in a massive body, which in turn, is securely fixed in the welder housing.

The use of the massive body for fastening the end of the active-resonance rod to the welder housing makes it possible to change the arrangement of the acoustic unit.

Figure 2:
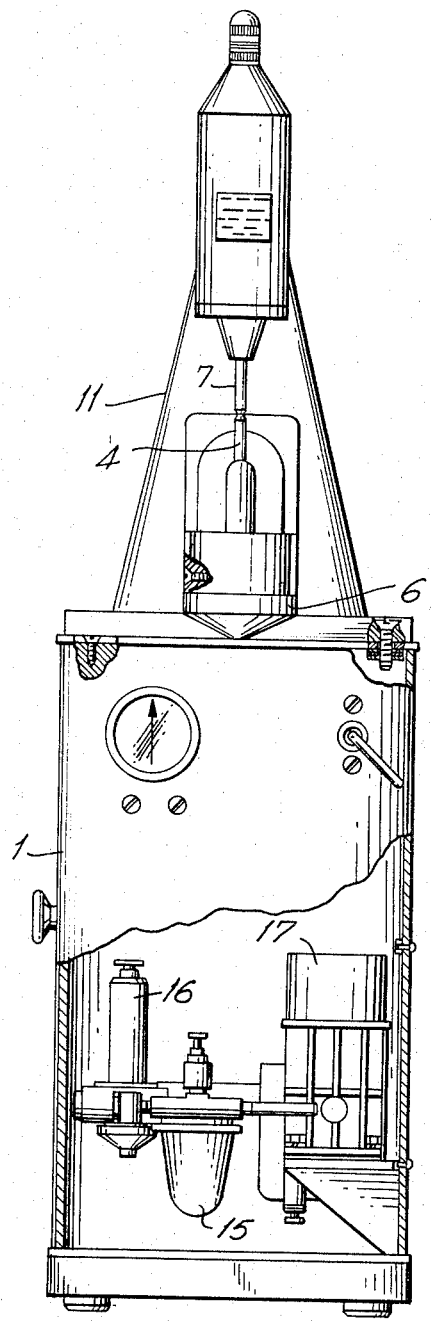

The commercial application of the proposed ultrasonic welder will make it feasible to extend the range of shapes of the articles to be welded, to dispense with turning the articles relative to each other and around the welding tip, as well as to simplify the design of the welder and to reduce its mass. The invention will hereinafter be described by way of the preferred embodiment with reference to the accompanying drawings wherein:

FIG. 1 is a side cross-sectional view of a welder,
FIG. 2 is a front view of a welder.

The ultrasonic welder comprises a housing 1 (FIG. 1), a magnetostriction transducer 2, a concentrator 3 rigidly fastened and acoustically connected to said transducer, and an active-resonance rod 4 rigidly fastened and acoustically connected to said concentrator. The lower end of the active-resonance rod is rigidly fastened and acoustically connected to massive body 5, which in turn, is fixed on cantilever portion 6 located below the longitudinal axis of said concentrator.

Passive-resonance rod 7 is located above the active-resonance rod and is intended for transmitting a clamping force to the articles to be welded. One end of the passive-resonance rod is rigidly fastened and acoustically connected to massive body 8 which serves as a piston of the pressure drive. The term "passive-resonance" applied to the rod 7 indicates its dependence on the parameters of the acoustic unit and by no means defines the efficiency of its operation. The working stroke is determined by piston 9 and adjusting nut 10. The assembly is accommodated in a cast Silumin head 11, bolted to the welder housing.

The welder housing contains a standard apparatus (timer) 12 for a control of the welding cycle, a throttle valve 13, a water separator 14, a lubricator 15 (FIG. 2), a reducing valve 16 and an electromagnetic valve 17 of the pneumatic system.

The design of cooling tank 18 (FIG. 1) of a magnetostriction transducer provides for air supply on one side of said transducer.

What is claimed is:
1. An ultrasonic welder comprising a housing, transducer means fixed in said housing for converting electrical energy into mechanical vibratory energy at an ultrasonic frequency, a vibratory energy concentrator mounted within said housing and coupled to said transducer means for transmitting the vibratory energy substantially in a horizontal direction, a first rod disposed substantially vertically in a working position, said rod having opposite ends and being coupled with the concentrator intermediate said ends to produce ultrasonic vibrations, the lower end of said rod being fixedly secured, a second rod disposed above the said first rod in vertical alignment for clamping the workpieces to be welded between the adjacent ends of the said rods, and a drive connected with the said second rod for vertical movement thereof in relation to the first rod to enable placement of the workpieces to be welded therebetween and to apply a clamping force to the workpieces during welding.

2. A welder as claimed in claim 1 wherein said housing includes a cantilever portion beneath the concentrator, said lower end of the first rod being fixedly secured to said cantilever portion.

3. A welder as claimed in claim 2 wherein said cantilever portion is horizontal.

4. A welder as claimed in claim 3 wherein said cantilever portion has a length approximately equal to that of the concentrator, the thickness of the cantilever being substantially less than its length.

References Cited

UNITED STATES PATENTS

| | | | |
|---|---|---|---|
| 3,052,020 | 9/1962 | Jones et al. | 29—470.1 |
| 3,234,641 | 2/1966 | Schneider et al. | 228—1 |

RICHARD H. EANES, JR., *Primary Examiner.*

JOHN F. CAMPBELL, *Examiner.*

MARTIN L. FAIGUS, *Assistant Examiner.*